United States Patent
Okahashi et al.

(10) Patent No.: US 12,204,185 B2
(45) Date of Patent: Jan. 21, 2025

(54) OPTICAL WAVEGUIDE ELEMENT AND OPTICAL MODULATOR

(71) Applicant: SUMITOMO OSAKA CEMENT CO., LTD., Tokyo (JP)

(72) Inventors: Kosuke Okahashi, Tokyo (JP); Shingo Takano, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 217 days.

(21) Appl. No.: 17/757,951

(22) PCT Filed: Oct. 20, 2020

(86) PCT No.: PCT/JP2020/039347
§ 371 (c)(1),
(2) Date: Jun. 24, 2022

(87) PCT Pub. No.: WO2021/131273
PCT Pub. Date: Jul. 1, 2021

(65) Prior Publication Data
US 2023/0026594 A1 Jan. 26, 2023

(30) Foreign Application Priority Data
Dec. 26, 2019 (JP) .................................. 2019-236029

(51) Int. Cl.
*G02F 1/035* (2006.01)
*G02B 6/13* (2006.01)
(Continued)

(52) U.S. Cl.
CPC ............... *G02F 1/035* (2013.01); *G02B 6/13* (2013.01); *G02F 1/212* (2021.01); *G02B 2006/12061* (2013.01)

(58) Field of Classification Search
CPC . G02F 1/035; G02F 1/212; G02F 1/03; G02B 6/13; G02B 2006/12061; G02B 2006/12097
(Continued)

(56) References Cited

U.S. PATENT DOCUMENTS 5,991,491 A * 11/1999 Madabhushi ......... G02F 1/2255 385/2
6,950,580 B2 * 9/2005 Mitomi ................. G02F 1/2255 385/40
(Continued)

FOREIGN PATENT DOCUMENTS

JP 5257105 A 10/1993
JP 0756036 A 3/1995
(Continued)

OTHER PUBLICATIONS

ISR issued in PCT/JP2020/039347, mailed Jan. 12, 2021.

*Primary Examiner* — Jerry Rahll
(74) *Attorney, Agent, or Firm* — Greer Burns & Crain Ltd.

(57) ABSTRACT

In order to provides an optical waveguide element and an optical modulator that can prevent the damage to the substrate and the deterioration of the properties of the substrate that may occur due to the stress, by reducing the influence of stress on the substrate by the buffer layer, the optical waveguide 1 is provided with a substrate 5 having an electro-optical effect; an optical waveguide 10 formed on the substrate 5; a first buffer layer 9a provided on the substrate 5; and a second buffer layer 9b provided under the substrate 5, wherein the first buffer layer 9a and the second buffer layer 9b are composed of substantially the same material and have substantially the same thickness, and the first buffer layer 9a and the second buffer layer 9b are formed to be in (Continued)

contact with an upper surface and lower surface of the substrate 5, respectively.

10 Claims, 13 Drawing Sheets

(51) Int. Cl.
*G02F 1/21* (2006.01)
*G02B 6/12* (2006.01)

(58) Field of Classification Search
USPC .......................................... 385/2–4, 129–132
See application file for complete search history.

(56) References Cited

U.S. PATENT DOCUMENTS

2010/0232736 A1\* 9/2010 Ichikawa .............. G02F 1/0356
 385/2
2015/0277156 A1\* 10/2015 Kondou ................ G02F 1/0356
 385/2

FOREIGN PATENT DOCUMENTS

| JP | 10274758 A | 10/1998 |
| JP | 3001027 B2 | 1/2000 |
| JP | 2008089936 A | 4/2008 |
| JP | 2013025283 A | 2/2013 |
| JP | 2017032968 A | 2/2017 |
| JP | 2019105808 A | 6/2019 |

\* cited by examiner

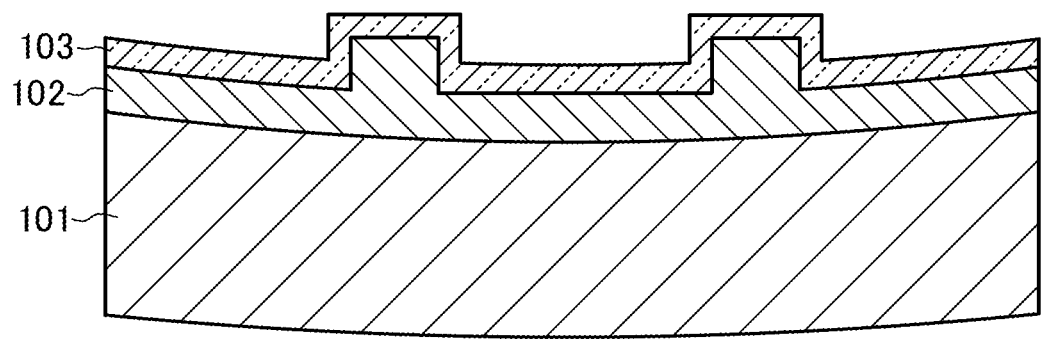
FIG.8 [ PRIOR ART ]

OPTICAL WAVEGUIDE ELEMENT AND OPTICAL MODULATOR

FIELD OF THE INVENTION

The present invention relates to an optical waveguide element and an optical modulator used in the fields of optical communication and optical measurement. The present invention particularly relates to an optical waveguide element in which an optical waveguide and electrodes are provided on a substrate having an electro-optical effect, and an optical modulator in which the optical waveguide element is packaged.

BACKGROUND ART

In recent years, in the field of optical communication and the field of optical measurement, an optical waveguide element in which an optical waveguide is formed on a substrate having an electro-optical effect such as lithium niobate ($LiNbO_3$: hereinafter referred to as LN) has been used. Further, in order to modulate the light wave propagating in the optical waveguide formed in the optical waveguide element, an optical modulator in which an electrode or the like is provided in the optical waveguide element is used.

Further, in order to realize a wide band of the optical modulation frequency, it is important to achieve speed matching between the microwave and the optical wave, which are the modulated signals. For this reason, attempts have been made to reduce the drive voltage while achieving speed matching between microwaves and light waves by thinning the substrate to reduce the thickness of the substrate.

Patent Document 1 below discloses an optical element comprising: a first substrate of a single crystal; a second substrate composed of an electro-optical medium on which a core of a ridge type waveguide is formed; and an overclad layer bonded to an upper part of the ridge type waveguide by a direct bonding method. According to the optical element disclosed in Patent Document 1, it is possible to improve a symmetry of a shape of a waveguide mode while suppressing an occurrence of stress strain accompanied by a formation of the overclad layer, by providing a single crystal overclad layer whose thermal expansion coefficient values are similar to those of the first and second substrates constituting the waveguide.

Patent Documents 2 and 3 below disclose that the DC drift properties can be improved by adding an oxide such as indium or titanium to an $SiO_2$ buffer layer.

CITATION LIST

Patent Literature

[Patent Document 1] Japanese Patent Application Publication No. 2019-105808
[Patent Document 2] Japanese Patent Application Publication No. 2013-25283
[Patent Document 3] Japanese Patent Publication No. 3001027

SUMMARY OF THE INVENTION

Technical Problem

In an optical modulator having a thin plate rib type optical waveguide structure having a thickness of several μm or less, it is necessary to form a buffer layer having a film thickness almost the same as the thickness of the thin plate by sputtering or vacuum deposition, in order to suppress light absorption by electrodes. However, since the wafer is thinner than the conventional one, it is sensitive to stress. Further, for example, LN having an electro-optical effect is used for the wafer, while $SiO_2$ or the like is used for the buffer layer.

The coefficient of thermal expansion (linear expansion coefficient) is different between the material of the wafer (base) and the material of the buffer layer. As a result, when the buffer layer is formed in the wafer process or when the wafer or chip is heated, stress (internal stress or residual stress) is generated on the surface where the buffer layer and the wafer (substrate) come into contact with each other due to the difference in the thermal expansion ratio between the wafer (substrate) and the buffer layer. As a result, there is a problem that the substrate is damaged by the stress on the substrate by the buffer layer, and the substrate is cracked or the like.

In addition, the substrate is made of a material having an electro-optical effect such as LN, and light modulation is performed by applying electricity to change the refractive index. However, there is such a problem that when stress is generated on the substrate by the buffer layer, the refractive index of the substrate changes due to the photoelastic effect, and the propagation speed of the light wave changes. As a result, there is such a problem that, for example, in an optical modulator having a Mach-Zehnder structure, a phase difference occurs at the time of a wave combination in the Mach-Zehnder structure, so that property deterioration such as a fluctuation of a bias voltage occurs.

The problem when stress is generated on the substrate by the buffer layer will be described with reference to FIG. 8. FIG. 8 schematically illustrates the cross-sectional structure of an optical waveguide element used in a next-generation optical modulator. The cross-sectional structure shown in FIG. 8 illustrates a state in which a substrate 102 made of LN is formed on the reinforcing substrate 101 and a buffer layer 103 is further formed on the substrate 102.

In the conventional optical waveguide element having a rib-type structure, since the substrate is sufficiently thick with respect to the thickness of the buffer layer (for example, 0.5 to 1.0 μm), even if there was a difference in the coefficient of thermal expansion between the material of the buffer layer and the material of the substrate, it was not likely to be affected by the stress caused by the difference in the coefficient of thermal expansion.

On the other hand, in the optical waveguide element used in the next-generation optical modulator, as shown in FIG. 8, the substrate 102 is thinned to the same film thickness as the buffer layer 103 (for example, about 1.0 μm). The thinned substrate 102 is sensitive to the stress caused by the buffer layer 103. As a result, when the buffer layer 103 is formed or heated in the wafer process, as shown in FIG. 8, the stress caused by the difference in the coefficient of thermal expansion between the material of the buffer layer 103 and the material of the substrate 102 is increased. Under the influence, the substrate 102 is deformed (for example, the substrate 102 is warped), and the substrate 102 is damaged and cracked, or the properties of the substrate 102 are deteriorated.

The disclosure technique of Patent Document 1 adopts a configuration in which the overclad layers are bonded by a direct bonding method without forming a buffer layer in consideration of the problem caused by the stress on the substrate by the buffer layer. The buffer layer is a layer formed to suppress light absorption by an electrode loaded on the surface of a substrate, and has been widely used in order to efficiently reduce propagation loss. However, when a configuration that does not form a buffer layer is adopted as in the disclosed technology of Patent Document 1, there arises new problems that the role played by the buffer layer must be supplemented by another ingenuity, and that the design, the manufacturing process and the like of the optical waveguide element must be significantly changed.

In order to solve the above problems, it is an object of the present invention to prevent the damage to the substrate and the deterioration of the properties of the substrate that may occur due to stress, by reducing the influence of the stress on the substrate by the buffer layer.

Means to Solving Problems

In order to solve the above problems, the optical waveguide element and the optical modulator according to the present invention have the following technical features.

(1) The optical waveguide element according to the present invention comprises: a substrate having an electro-optical effect; an optical waveguide formed on the substrate; a first buffer layer provided on the substrate; and a second buffer layer provided under the substrate, wherein the first buffer layer and the second buffer layer are composed of substantially the same material and have substantially the same thickness, and the first buffer layer and the second buffer layer are formed to be in contact with an upper surface and lower surface of the substrate, respectively.

By this configuration, the stress similar to the stress generated on the upper surface of the substrate by the first buffer layer can be generated on the lower surface of the substrate by the second buffer layer, so that the stress balance between the upper surface and the lower surface of the substrate can be made uniform. As a result, the bias of stress on the upper surface and the lower surface of the substrate can be alleviated to prevent deformation of the substrate, thereby making it possible to prevent the damage to the substrate and the deterioration of the properties of the substrate.

(2) The optical waveguide element according to (1) above is characterized in that the first buffer layer and the second buffer layer are respectively formed by: a mixture of silicon oxide and at least one oxide of one or more elements selected from the metal elements of groups 3-8, 1b and 2b of the periodic table and semiconductor elements other than silicon; or a transparent insulating film of an oxide of silicon and one or more elements selected from the metal element and the semiconductor element.

By this configuration, for example, by arranging the first buffer layer and the second buffer layer to which a metal oxide such as indium or titanium is added above and below the substrate, it is possible to flatten the increase of the DC drift with elapse of time by the added metal oxide and to improve the DC drift properties over a long period of time.

(3) The optical waveguide element according to (1) or (2) above is characterized in that material of the first buffer layer and the second buffer layer has a lower refractive index than the material of the substrate having an electro-optical effect.

By this configuration, by using a material having a refractive index lower than that of the substrate at the top and bottom of the substrate, the effect of confining the propagating light in the optical waveguide formed on the substrate can be increased, so that the propagation loss can be efficiently reduced.

(4) The optical waveguide element according to any one of (1) to (3) above is characterized in that the material of the first buffer layer and the second buffer layer has an electrical resistivity of $10^8$ Ωcm or more and $10^{16}$ Ωcm or less.

By this configuration, appropriate DC drift properties can be obtained by controlling the electrical resistivity of the materials of the first buffer layer and the second buffer layer, so that light can be efficiently propagated in the optical waveguide. To be specific, by setting the resistance values of the first buffer layer and the second buffer layer in the range of $10^8$ Ωcm or more and $10^{16}$ Ωcm or less, an appropriate DC drift amount can be stably obtained.

(5) The optical waveguide element according to any one of (1) to (4) above is characterized in that the thickness of each of the first buffer layer and the second buffer layer is 0.3 μm or more and 2.0 μm or less.

By this configuration, appropriate DC drift properties can be obtained by controlling the thickness of the first buffer layer and the second buffer layer, so that light can be efficiently propagated in the optical waveguide. To be specific, by setting the thickness of the first buffer layer and the second buffer layer in the range of 0.3 μm or more and 2.0 μm or less, an appropriate DC drift amount can be stably obtained.

(6) The optical waveguide element according to any one of (1) to (5) above is characterized in that the optical waveguide element has a reinforcing substrate arranged under the second buffer layer, and the substrate and the second buffer layer are bonded by a direct bonding method.

By this configuration, the second buffer layer and the reinforcing substrate can be appropriately and surely bonded.

(7) The optical waveguide element according to (6) above is characterized in that the second buffer layer and the reinforcing substrate are bonded through an adhesive layer.

By this configuration, the second buffer layer and the reinforcing substrate can be appropriately and reliably bonded through the adhesive layer. Further, by forming the second buffer layer on the adhesive layer, the light absorption in the optical waveguide by the adhesive layer can be prevented by the second buffer layer.

(8) The optical waveguide element according to any one of (1) to (7) above is characterized in that the rib portion projecting from the substrate is used as the optical waveguide.

By this configuration, it is possible to make the balance of stress on the upper surface and the lower surface of the substrate uniform, even when the influence of stress becomes large with the thinning of the substrate due to the rib-type optical waveguide structure. As a result, the bias of stress on the upper surface and the lower surface of the substrate can be alleviated to prevent deformation of the substrate, so that the damage to the substrate and the deterioration of the properties of the substrate can be prevented.

(9) The optical waveguide element according to any one of (1) to (8) above is characterized in that the optical waveguide is formed by a plurality of Mach-Zehnder portions.

By this configuration, in an optical waveguide element having a plurality of Mach-Zehnder type optical waveguide structures capable of generating optical signals corresponding to various modulation methods, it is possible to make the stress balance on the upper surface and the lower surface of the substrate uniform. As a result, the bias of stress on the upper surface and the lower surface of the substrate can be alleviated to prevent the substrate from being deformed, thereby making it possible to prevent the damage to the substrate and the deterioration of the properties of the substrate.

(10) In order to achieve the above object, an optical modulator according to the present invention is at least partly constituted by the optical waveguide constituting the optical waveguide element according to any one of (1) to (9) above.

By this configuration, the stress balance on the upper and lower surfaces of the substrate can be made uniform. As a result, there is realized an optical modulator capable of alleviating the bias of stress on the upper surface and the lower surface of the substrate, preventing deformation of the substrate, and preventing the damage to the substrate and the deterioration of the properties of the substrate.

Effect of the Invention

According to the present invention, in the optical waveguide element and the optical modulator, it is possible to prevent the damage to the substrate and the deterioration of the properties of the substrate that may occur due to stress, by reducing the influence of the stress on the substrate by the buffer layer.

BRIEF DESCRIPTION OF DRAWINGS

FIG. 8 is a diagram for explaining a problem to be solved by the present invention.

DETAILED DESCRIPTION OF EMBODIMENTS

Hereinafter, the optical waveguide element and the optical modulator according to the embodiments of the present invention will be described.

Figure 1:
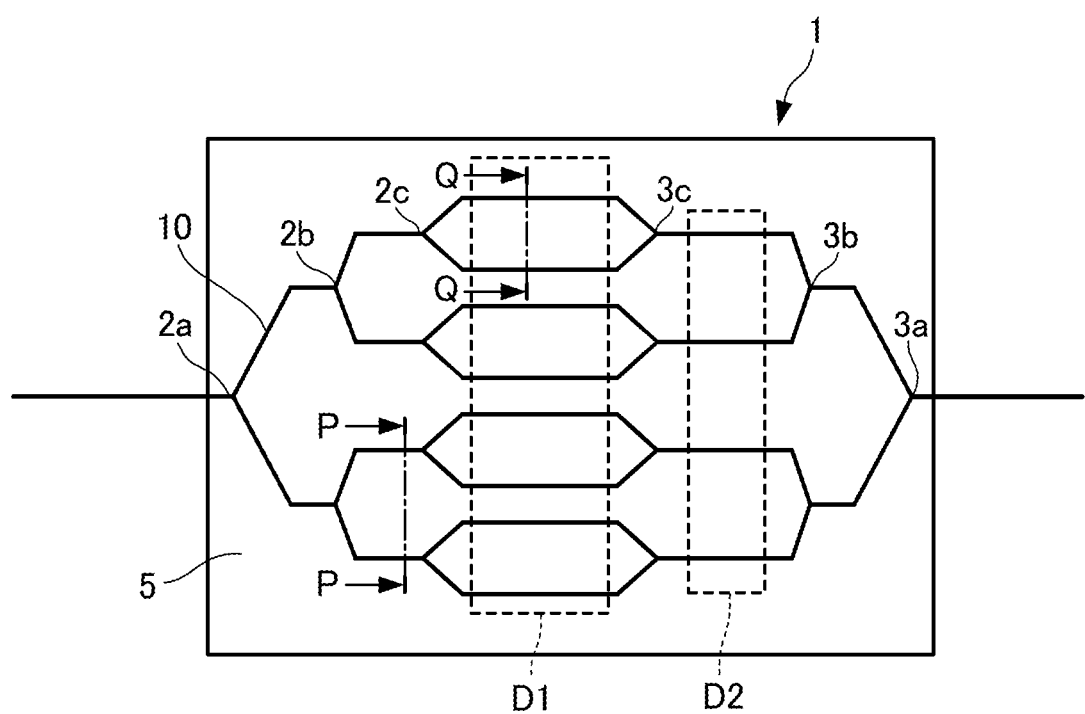
FIG. 1 is a plan view for explaining an example of an optical waveguide formed on a substrate constituting an optical waveguide element in the embodiment of the present invention.

FIG. 1 is a plan view for explaining an example of the optical waveguide 10 formed on the substrate 5 constituting the optical waveguide element 1 in the embodiment of the present invention. In FIG. 1, the optical waveguide element 1 is shown in such a manner that a width direction of the optical waveguide element 1 is a vertical direction of the paper surface, a longitudinal direction of the optical waveguide element 1 is a horizontal direction of the paper surface, and a thickness direction of the optical waveguide element 1 is a direction perpendicular to the paper surface.

The optical waveguide element 1 shown in FIG. 1 is an optical waveguide element 1 in which a plurality of Mach-Zehnder type optical waveguides are integrated. An optical waveguide in which a plurality of Mach-Zehnder type optical waveguides are combined is also called a nested optical waveguide. The optical waveguide element 1 in which a plurality of Mach-Zehnder type optical waveguides are integrated can generate optical signals corresponding to various modulation methods. As an example, FIG. 1 shows an optical waveguide element 1 in which a plurality of Mach-Zehnder-type optical waveguides are integrated, but the present invention is not limited to this configuration, and, for example, an optical waveguide element 1 having a single Mach-Zehnder-type optical waveguide may be used.

As shown in FIG. 1, the optical waveguide element 1 according to the embodiment of the present invention is provided with an optical waveguide 10 formed on a substrate 5 made of a material having an electro-optical effect. The optical waveguide element 1 shown in FIG. 1 is provided with: a first branch portion 2a that branches an incident waveguide into which an optical signal is introduced from the outside; a second branch portion 2b that further branches the optical waveguide 10 branched by the first branch portion 2a; and a third branch portion 2c that further branches the optical waveguide 10 branched at the second branch portion 2b, so that the optical waveguide 1 has formed therein total eight parallel waveguides through three-step branching. The first to third branch portions 2a to 2c are realized by an optical coupler or the like.

The phase of the light wave propagating in each parallel waveguide is adjusted, for example, in a region D1. A metal modulation electrode (not shown in FIG. 1) is formed in the region D1, so that a refractive index of the light wave can be changed by the electric field applied from the modulation electrode to each parallel waveguide, thereby to adjust the propagation speed of the light wave.

The light wave propagating in each parallel waveguide is combined in the first to third synthesis portions 3a to 3c corresponding to each of the first to third branch portions 2a to 2c, and then outputted from an exit waveguide to an outside. To be specific, the optical waveguide element 1 shown in FIG. 1 is provided with: a third synthesis portion 3c that synthesizes a parallel waveguide branched at the third branch portion 2c; a second synthesis portion 3b that synthesizes the optical waveguide 10 branched at the second branch portion 2b; and a third synthesis portion 3c that synthesizes the optical waveguide 10 branched at the first branch portion 2a, and an optical signal is outputted from an exit waveguide through three-step synthesis. Similar to the first to third branch portions 2a to 2c, the first to third synthesis portions 3a to 3c are also realized by an optical coupler or the like.

The optical waveguide 10 of the optical waveguide element 1 shown in FIG. 1 is an example, and the present invention is not limited thereto. For example, as in an optical waveguide element 202 of an optical modulator 200 described later with reference to FIG. 7, the present invention may be so configured that two optical signals are outputted from the optical waveguide element 202 and the polarization is synthesized by the polarization synthesis unit 228.

Further, a bias voltage for setting an operating point is applied to the optical waveguide 10. The bias voltage is applied to the phase-modulated light wave by, for example, a bias electrode formed in the region D2.

Figure 2:
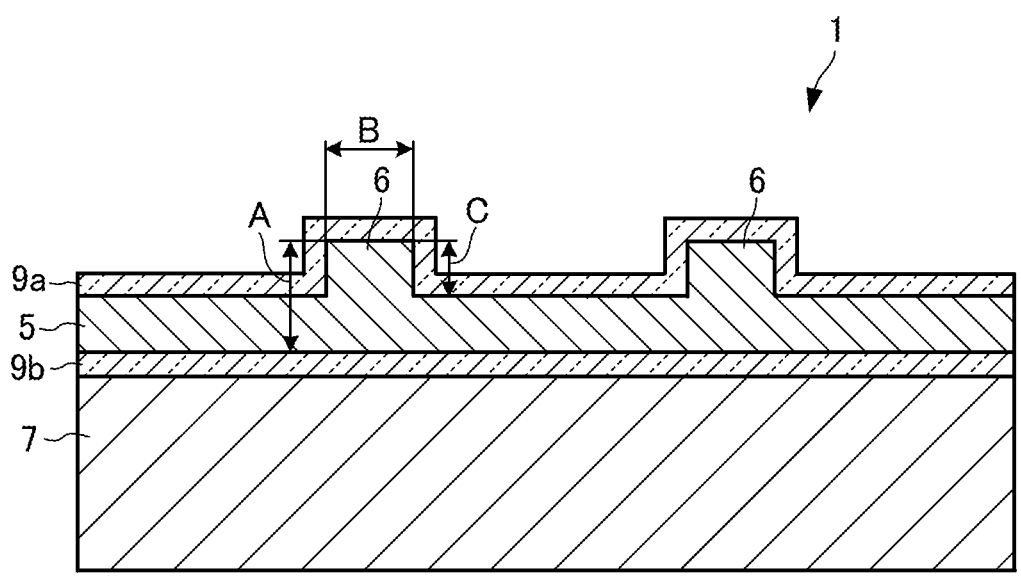
FIG. 2 is a diagram showing a first example of a cross-sectional structure of an optical waveguide element according to an embodiment of the present invention, and is a cross-sectional view taken along the line segment PP of FIG. 1.

FIG. 2 is a diagram showing a first example of the cross-sectional structure of the optical waveguide element 1 according to the embodiment of the present invention, and is a cross-sectional view taken along the line PP of FIG. 1. In FIG. 2, the optical waveguide element 1 is shown in such a manner that a thickness direction of the optical waveguide element 1 is a vertical direction of the paper surface, a width direction of the optical waveguide element 1 is a horizontal direction of the paper surface, and a longitudinal direction of the optical waveguide element 1 is a direction perpendicular to the paper surface.

As shown in the cross-sectional structure of FIG. 2, the optical waveguide element 1 has such a structure in which a lower buffer layer (second buffer layer) 9b is provided on the reinforcing substrate 7, the substrate 5 is provided on the lower surface buffer layer 9b, and an upper buffer layer (first buffer layer) 9a is provided on the substrate 5.

The substrate 5 is made of a material having an electro-optical effect. While the conventional substrate has a thickness of about 8 to 10 μm, the substrate 5 in the embodiment of the present invention can use, for example, an extremely thin plate having a thickness of 2.0 μm or less, preferably 1.0 μm or less. By making the thickness of the substrate 5 extremely thin (for example, about 1/10 of the conventional thickness), it is possible to further reduce the drive voltage. For the substrate 5, for example, LN can be used as a material having an electro-optical effect, but lithium tantalate (LiTaO$_3$), lead lanthanate titanate (PLZT), or the like may be used.

A rib portion 6 is provided on the substrate 5. The rib portion 6 is projected from the surface of the substrate 5 and has an action of confining light waves, and is therefore used as an optical waveguide 10. In the conventional diffusion type optical waveguide structure, the action of confining light is weak, and the propagating light may leak from the optical waveguide 10 at a curved portion or the like. On the other hand, when the rib-type optical waveguide structure is adopted, the action of confining light is strengthened, the optical waveguide 10 can be bent to form a folded structure, so that it is possible to shorten the length of the optical waveguide element 1. The height of the rib portion 6 is, for example, 2.0 μm or less, preferably 1.0 μm or less from the surface of the substrate 5.

The dimensions of the rib-type substrate will be described in more detail below. In the rib-type substrate according to the embodiment of the present invention, for example, the maximum value of the thickness A of the substrate 5 including the rib portion 6 is 4.0 μm, the maximum value of the width B of the rib portion 6 is 4.0 μm, and the rib portion. The maximum value of the height C of the rib portion 6 is 2.0 μm, and the ratio of the thickness A to the width B is 1:1. Since the smaller the rib portion 6 and the substrate 5 in design, the more preferable the minimum values of the thickness A, the width B, and the height C are the limit values for minimization in the manufacturing process. Further, from the viewpoint of confining light, as long as the dimensions are within a range in which the single mode condition of light is maintained, the smaller the respective dimensions of the thickness A and the width B, the more preferable since the more the light is confined, FIG. 2 shows, as an example, an optical waveguide element 1 having a rib-type substrate in which the rib portion 6 is formed on the substrate 5. However, although, in the present invention, it is preferable to have a structure having a rib-type substrate in which the rib portion 6 is formed as the optical waveguide 10, the structure is not limited to this, and an optical waveguide element 1 in which the optical waveguide 10 is formed inside of the substrate 5 by thermal diffusion of metal may be used.

The reinforcing substrate 7 is a member that supplements the strength of the extremely thin substrate 5 and can stably support the lower surface buffer layer 9b, the substrate 5, the upper surface buffer layer 9a, and the electrodes formed on the substrate 5. As will be described later, the reinforcing substrate 7 is directly bonded to the lower surface buffer layer 9b by a direct bonding method. As the material of the reinforcing substrate 7, for example, a material having a lower dielectric constant than the material of the substrate 5 (for example, LN) or the same material as the substrate 5 (for example, LN) can be used.

Further, an upper surface buffer layer 9a is provided on the substrate 5. The upper surface buffer layer 9a in the embodiment of the present invention has a thickness the same as that of the substrate 5, for example, 2.0 μm or less, preferably 1.0 μm or less. The material used for the upper surface buffer layer 9a is not particularly limited, but is preferably a material having a lower refractive index than LN and excellent light transmission. The material used for the upper surface buffer layer 9a may be a material generally used as a buffer layer. For example, $SiO_2$, $Al_2O_3$, $MgF_3$, $La_2O_3$, ZnO, $HfO_2$, MgO, $CaF_2$, $Y_2O_3$ and the like may be used.

Whereas the thickness of the conventional substrate was 8.0 to 10.0 in the embodiment of the present invention, the thickness of the rib-type substrate can be made extremely thin to 2.0 μm or less as described above, so that it is possible to match the speed between microwaves and light waves and further reduce the drive voltage. However, such an extremely thin substrate 5 is particularly sensitive to stress.

Further, as described above, for example, LN is used for the substrate 5, whereas $SiO_2$ is used for the upper surface buffer layer 9a provided on the substrate, but LN which is the material of the substrate 5 and $SiO_2$ which is the material of the upper surface buffer layer 9a differ from each other in thermal expansion coefficient. Therefore, stress (internal stress or residual stress) is generated on the surface where the upper surface buffer layer 9a and the substrate 5 come into contact with each other, due to the difference in thermal expansion coefficient between the substrate 5 and the upper surface buffer layer 9a, when the upper surface buffer layer 9a is formed or when the wafer (substrate 5) or the chip is heated, especially in a wafer process involving temperature changes.

As a result, there are such problems that the substrate 5 is deformed under influence of the stress due to the difference of the thermal expansion coefficient between the material of the upper surface buffer layer 9a and the material of the substrate 5, and that the deterioration of the properties occurs such as a fluctuation of bias voltage.

In order to cope with such a problem, in the optical waveguide element 1 according to the embodiment of the present invention, as shown in FIG. 2, a lower surface buffer layer 9b is provided between the reinforcing substrate 7 and the substrate 5. The lower surface buffer layer 9b in the embodiment of the present invention has substantially the same thickness as the upper surface buffer layer 9a, for example, 2.0 μm or less, preferably 1.0 μm or less. Further, for the lower surface buffer layer 9b, substantially the same material as that of the upper surface buffer layer 9a is used.

Further, the fact that the upper surface buffer layer 9a and the lower surface buffer layer 9b have substantially the same thickness means that the upper surface buffer layer 9a and the lower surface buffer layer 9b have the same or substantially the same film thickness. To be specific in the present invention, the upper buffer layer 9a and the lower buffer layer 9b are defined to have substantially the same thickness, in the case that the difference in thickness between the upper surface buffer layer 9a and the lower surface buffer layer 9b is within ±20% with respect to the relative thickness of the upper surface buffer layer 9a or the lower surface buffer layer 9b, including an error due to process variation during manufacturing.

The fact that the upper surface buffer layer 9a and the lower surface buffer layer 9b are made of substantially the same material means that the upper surface buffer layer 9a and the lower surface buffer layer 9b are made of the same material or a material having substantially the same material. To be specific, in the present invention, the upper buffer layer 9a and the lower buffer layer 9b are defined to be made of substantially the same material, in the case that the difference in electrical resistivity between the upper surface buffer layer 9a and the lower surface buffer layer 9b is within ±20% with respect to the electrical resistivity of the upper surface buffer layer 9a or the lower surface buffer layer 9b and the difference in the refractive index between the upper surface buffer layer 9a and the lower surface buffer layer 9b is within ±20% with respect to the refractive index of the upper surface buffer layer 9a or the lower surface buffer layer 9b, including an error due to process variation during manufacturing.

The method for measuring the film thickness, the electrical resistivity, and the refractive index is not particularly limited, and each parameter can be measured by a normal method. For example, with regard to the film thickness, it is possible to measure the film thickness using a general stylus type step system for a batch formed by charging a large number of wafers embedded with dummy wafers therein. Regarding the electrical resistivity, IV measurement (current/voltage measurement) using the mercury probe method can be performed on the batch including the dummy wafer, and the electrical resistivity can be calculated from the measurement result. Regarding the measurement of the refractive index, the refractive index can be measured by using a prism coupler (for example, measurement wavelength: 1550 nm) for the batch including the dummy wafer.

In the optical waveguide element 1 according to the embodiment of the present invention, the upper surface buffer layer 9a and the lower surface buffer layer 9b made of substantially the same material and having substantially the same thickness are formed. Further, the upper surface buffer layer 9a is formed so as to be in contact with the upper surface of the substrate 5, and the lower surface buffer layer 9b is formed so as to be in contact with the lower surface of the substrate 5. By having the structure in which the upper surface buffer layer 9a and the lower surface buffer layer 9b sandwich the substrate 5 in this way, the stress similar to the stress generated on the upper surface of the substrate 5 by the upper surface buffer layer 9a can be generated on the lower surface of the substrate 5 by the lower surface buffer layer 9b, so that the stress balance on the upper surface and the lower surface of the substrate 5 can be made uniform. As a result, the bias of stress on the upper surface and the lower surface of the substrate 5 is alleviated, so that the deformation of the substrate 5 can be prevented, thereby making it possible to prevent the damage to the substrate 5 and the deterioration of the properties of the substrate.

It is known that the increase of the DC drift with elapse of time can be flattened by the added metal oxide and the DC drift properties can be improved over a long period of time, by adding a metal oxide such as indium or titanium to the buffer layer (upper surface buffer layer 9a) provided on the substrate 5 (see Patent Documents 2 and 3). By applying this technique, the draft properties may be further improved by adding a metal oxide to both the upper surface buffer layer 9a and the lower surface buffer layer 9b.

To be more specific, both the upper buffer layer 9a and the lower buffer layer 9b may be formed by: a mixture of silicon oxide and at least one oxide of one or more elements selected from the metal elements of groups 3-8, 1b and 2b of the periodic table and semiconductor elements other than silicon; or a transparent insulating film of an oxide of silicon and one or more elements selected from the metal element and the semiconductor element. To be specific, for the upper surface buffer layer 9a and the lower surface buffer layer 9b, for example, a material obtained by adding (doping) a metal oxide such as indium, titanium, zinc, tin, chromium, aluminum, or germanium to $SiO_2$ is used.

The elemental species of the additives added to the upper surface buffer layer 9a and the lower surface buffer layer 9b may be the same or different between the upper surface buffer layer 9a and the lower surface buffer layer 9b. The upper surface buffer layer 9a and the lower surface buffer layer 9b according to the present invention are made of substantially the same material. And, as described above, it would be sufficient if the difference in the refractive index between the upper surface buffer layer 9a and the lower surface buffer layer 9b is within ±20% with respect to the refractive index of the upper surface buffer layer 9a or the lower surface buffer layer 9b, including an error due to process variation during manufacturing. Additives added to the upper surface buffer layer 9a and the lower surface buffer layer 9b may be different as long as this condition can be satisfied.

Further, it is known that the light absorption by the buffer layer can be suppressed and that the occurrence of positive DC drift can be prevented, by using a material having an appropriate electrical resistivity as the material of the buffer layer (upper surface buffer layer 9a) provided on the substrate 5 (see, for example, Patent Document 3). By applying this technique, a material having an appropriate electrical resistivity may be used as the material of both the upper surface buffer layer 9a and the lower surface buffer layer 9b.

To be more specific, as the material of the upper surface buffer layer 9a and the lower surface buffer layer 9b, a material having an electrical resistivity of $10^8$ Ωcm or more and $10^{16}$ Ωcm or less may be used. By setting the electrical resistivity of the material used for the upper surface buffer layer 9a and the lower surface buffer layer 9b to $10^8$ Ωcm or more, it becomes possible to prevent light absorption by the upper surface buffer layer 9a and the lower surface buffer layer 9b. Further, by setting the electrical resistivity of the material used for the upper surface buffer layer 9a and the lower surface buffer layer 9b to $10^{16}$ Ωcm or less, it becomes possible to stably obtain a negative DC drift amount at the initial stage of the passage of time.

Further, as the material of the upper surface buffer layer 9a and the lower surface buffer layer 9b, a material having a refractive index lower than that of the material of the substrate 5 having an electro-optical effect (for example, LN) may be used. By using the upper surface buffer layer 9a and the lower surface buffer layer 9b arranged above and below the substrate 5 as materials having a refractive index lower than that of the substrate 5, the effect of confining the propagating light in the optical waveguide 10 formed on the substrate 5 is increased, so that the propagation loss can be efficiently reduced.

Further, by controlling the thicknesses of the upper surface buffer layer 9a and the lower surface buffer layer 9b, an appropriate DC drift characteristic may be obtained so that the light can be efficiently propagated in the optical waveguide 10. To be specific, by setting the thickness of the upper surface buffer layer 9a and the lower surface buffer layer 9b in the range of 0.3 µm or more and 2.0 µm or less, an appropriate DC drift amount can be stably obtained.

Next, the cross-sectional structure in the phase modulation portion where the modulation electrode is formed will be described.

Figure 3:
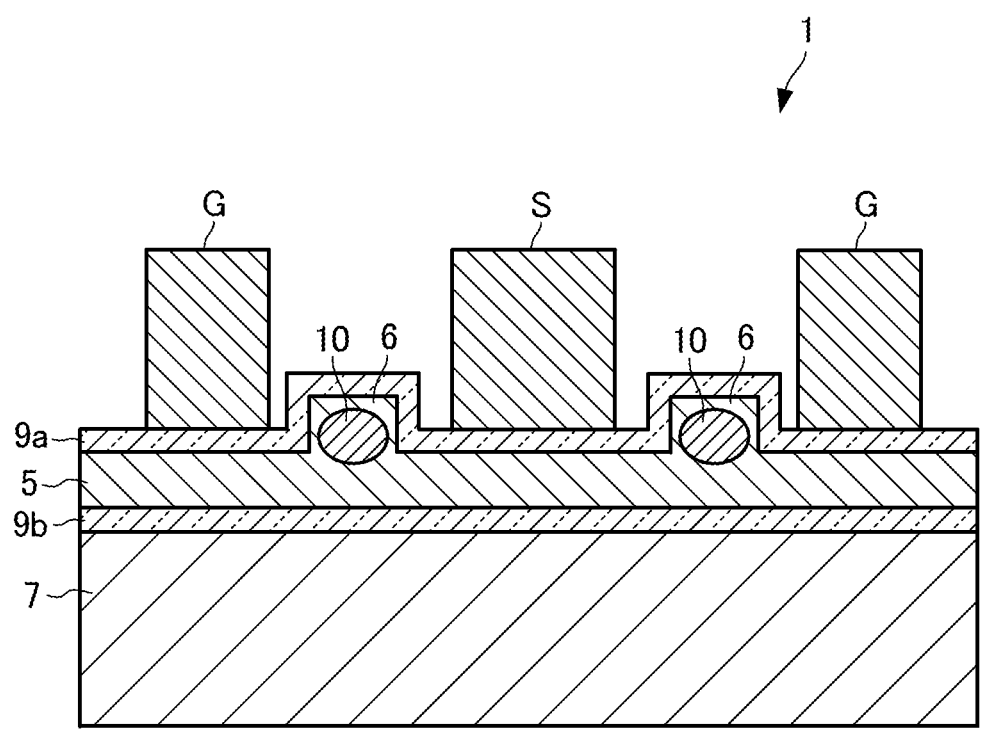
FIG. 3 is a diagram showing a second example of the cross-sectional structure of the optical waveguide element according to the embodiment of the present invention, and is a diagram showing a state in which a modulation electrode is formed on a substrate.

FIG. 3 is a diagram showing a second example of the cross-sectional structure of the optical waveguide element 1 according to the embodiment of the present invention, and is a diagram showing a state in which a modulation electrode is formed on the substrate 5. FIG. 3 is a cross-sectional view taken along the line Q-Q of FIG. 1. In FIG. 3, the optical waveguide element 1 is shown in such a manner that the thickness direction of the optical waveguide element 1 is the vertical direction of the paper surface, the width direction of the optical waveguide element 1 is the horizontal direction of the paper surface, and the longitudinal direction of the optical waveguide element 1 is the direction perpendicular to the paper surface.

FIG. 3 shows a cross-sectional structure of an optical waveguide element 1 in which modulation electrodes (signal electrode S and ground electrode G) are formed on the substrate 5, and the rib portion 6 of the substrate 5 is used as the optical waveguide 10. The substrate 5 shown in FIG. 3 has a structure in which the signal electrodes S are arranged between the optical waveguides 10.

The signal electrode S and the ground electrode G, which are modulation electrodes, are formed by, for example, depositing Ti/Au on the upper surface buffer layer 9a and then patterning the electrodes by a photolithography process. The modulation electrode may be made of an appropriate metal, and the method of forming the modulation electrode on the upper surface buffer layer 9a is not particularly limited. The thickness of the modulation electrode is, for example, 20 µm or more. Although description and illustration are omitted in the present specification, when the modulation electrode is formed on the buffer layer 9a, an antistatic conductive film layer made of Si or the like may be formed between the upper surface buffer layer 9a and the modulation electrode.

The signal electrode S is an electrode for applying an electric field to the optical waveguide 10, and is, for example, so arranged to extend in parallel with the optical waveguide 10. Although not shown, the signal electrode S is connected to a signal source and a terminating resistor, so that a high-frequency electric signal is supplied from the signal source and terminated by the terminating resistor.

The ground electrode G is an electrode connected to a reference potential point, and is, for example so arranged to extend in parallel with the optical waveguide 10 like the signal electrode S. The signal electrode S and the ground electrode G are provided apart from each other, so that an electric field is formed between the signal electrode S and the ground electrode G. The signal electrode S and the ground electrode G form, for example, a coplanar line.

The electric field formed between the signal electrode S and the ground electrode G is applied to the optical waveguide 10 formed in the rib portion 6. By controlling the electric signal supplied from the signal source and adjusting the electric field strength, the light wave propagating in the optical waveguide 10 is appropriately modulated.

As shown in FIG. 3, by adopting a structure in which the upper surface buffer layer 9a and the lower surface buffer layer 9b sandwich the substrate 5, the stress balance on the upper surface and the lower surface of the substrate 5 can be made uniform. As a result, the bias of stress on the upper surface and the lower surface of the substrate 5 is alleviated, so that the deformation of the substrate 5 can be prevented, thereby making it possible to prevent the damage to the substrate 5 and the deterioration of the characteristics of the substrate 5.

Figure 4:
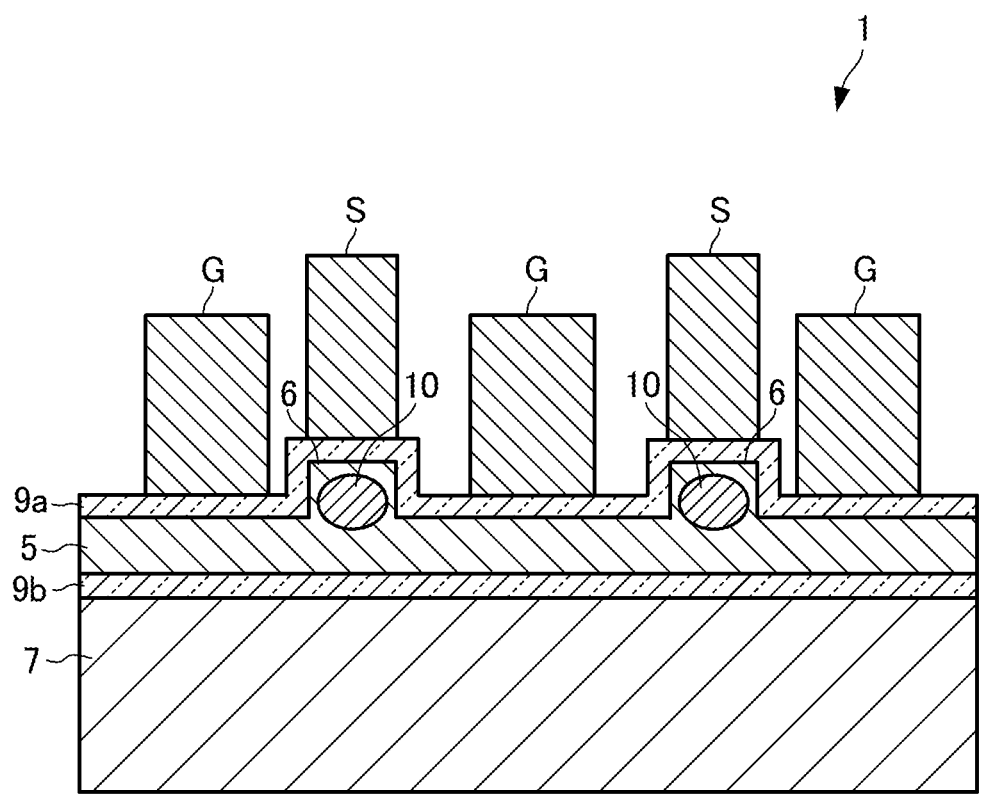
FIG. 4 is a diagram showing a third example of the cross-sectional structure of the optical waveguide element according to the embodiment of the present invention, and is a diagram showing a state in which a modulation electrode is formed on a substrate.

FIG. 4 is a diagram showing a third example of the cross-sectional structure of the optical waveguide element 1 according to the embodiment of the present invention, and is a diagram showing a state in which a modulation electrode is formed on the substrate 5. FIG. 4 is a cross-sectional view taken along the line Q-Q of FIG. 1. In FIG. 4, the optical waveguide element 1 is shown in such a manner that the thickness direction of the optical waveguide element 1 is the vertical direction of the paper surface, the width direction of the optical waveguide element 1 is the horizontal direction of the paper surface, and the longitudinal direction of the optical waveguide element 1 is the direction perpendicular to the paper surface.

FIG. 4 shows a cross-sectional structure of an optical waveguide element 1 in which modulation electrodes (signal electrode S and ground electrode G) are formed on the substrate 5 and the rib portion 6 of the substrate 5 is used as the optical waveguide 10. The substrate 5 shown in FIG. 4 has a structure in which the signal electrode S is arranged on the optical waveguide 10.

Similar to FIG. 3 described above, as shown in FIG. 4, the structure is such that the upper surface buffer layer 9a and the lower surface buffer layer 9b sandwich the substrate 5, so that the stress balance on the upper surface and the lower surface of the substrate 5 can be made uniform. As a result, the bias of stress on the upper surface and the lower surface of the substrate 5 is alleviated, so that the deformation of the substrate 5 can be prevented, thereby making it possible to prevent the damage to the substrate 5 and the deterioration of the characteristics of the substrate.

As described by taking the cross-sectional structure of FIGS. 3 and 4 as an example, the present invention presents a signal on a substrate 5 having a structure in which a signal electrode S is arranged between the optical waveguides 10 and a signal on the optical waveguide 10. The stress bias on the upper surface and the lower surface of the substrate 5 can be alleviated with respect to any of the substrates 5 having the structure in which the electrodes S are arranged. Further, the lower surface buffer layer 9*b* can be arranged over the entire lower surface of the substrate 5 regardless of the positions of the modulation electrodes (signal electrode S and ground electrode G) and the positions of the optical waveguide 10.

Next, the manufacturing process of the optical waveguide element 1 according to the embodiment of the present invention will be described with reference to FIGS. 5A to 5F. Note that FIGS. 5A to 5F show the manufacturing process of the optical waveguide element 1 having the cross-sectional structure of FIG. 3 as an example.

Figure 5A:
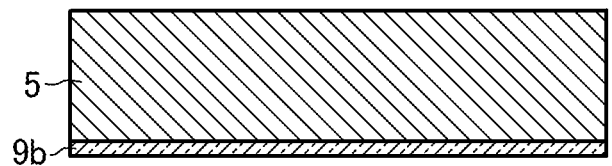
FIG. 5A is a diagram for explaining a manufacturing process of an optical waveguide element according to an embodiment of the present invention, and is a diagram showing a state after the first step.

In the first step, a layer (for example, $SiO_2$) to be the lower surface buffer layer 9*b* is formed with respect to the layer to be the substrate 5 (for example, the LN layer). FIG. 5A shows the state after the first step.

Figure 5B:
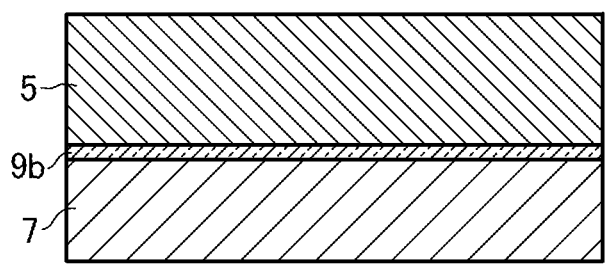
FIG. 5B is a diagram for explaining a manufacturing process of an optical waveguide element according to an embodiment of the present invention, and is a diagram showing a state after the second step.

In the second step, the lower surface of the layer to be the lower surface buffer layer 9*b* and the upper surface of the reinforcing substrate 7 are directly bonded by the direct bonding method. FIG. 5B shows the state after the second step.

Figure 5C:
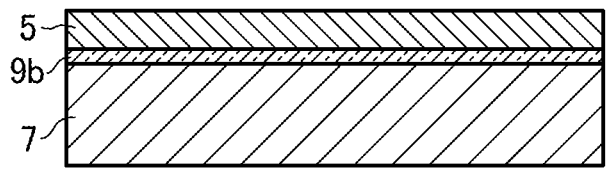
FIG. 5C is a diagram for explaining a manufacturing process of an optical waveguide element according to an embodiment of the present invention, and is a diagram showing a state after the third step.

In the third step, a layer made of a material having an electro-optical effect to be a substrate 5 is processed so as to have an appropriate thickness. FIG. 5C shows the state after the third step.

Figure 5D:
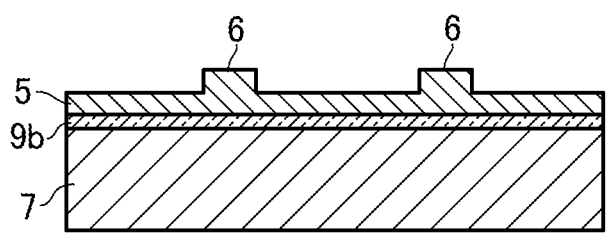
FIG. 5D is a diagram for explaining a manufacturing process of an optical waveguide element according to an embodiment of the present invention, and is a diagram showing a state after the fourth step.

In the fourth step, a portion other than the rib portion 6 is removed by, for example, dry etching to form a substrate 5 having the rib portion 6. FIG. 5D shows the state after the fourth step.

Figure 5E:
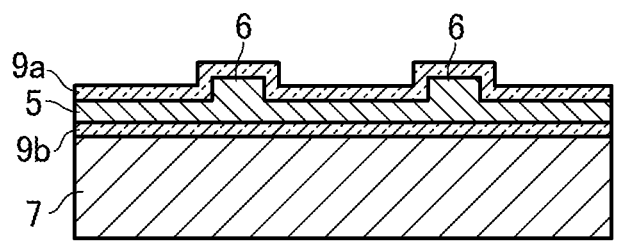
FIG. 5E is a diagram for explaining a manufacturing process of an optical waveguide element according to an embodiment of the present invention, and is a diagram showing a state after the fifth step.

In the fifth step, the upper surface buffer layer 9*a* is formed on the substrate 5 by, for example, sputtering. FIG. 5E shows the state after the fifth step.

Figure 5F:
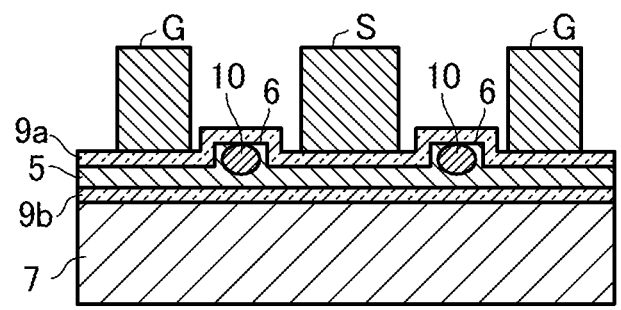
FIG. 5F is a diagram for explaining a manufacturing process of an optical waveguide element according to an embodiment of the present invention, and is a diagram showing a state after the sixth step.

In the sixth step, for example, electrodes (for example, a signal electrode and a ground electrode) are formed on the upper surface buffer layer 9*a*. FIG. 5F shows the state after the sixth step.

The direct bonding method used in the second step above is a suitable method for bonding dissimilar materials. Although the layer to be the buffer layer 9*b* and the reinforcing substrate 7 are made of different materials, they can be appropriately and surely bonded by using the direct bonding method.

The direct bonding method is roughly divided into two methods, which are a plasma activated bonding method and a FAB (Fast Atom Beam: high-speed atomic beam) method.

The plasma activated bonding method is a method in which two surfaces to be bonded by plasma or the like are treated with hydrophilicity to improve the bonding property, and then the two surfaces are overlapped to perform direct bonding. When the plasma activated bonding method is used, an interface layer (jponing layer) is formed in which the molecular chains of the layers to be the buffer layer 9*b* and the respective surfaces of the reinforcing substrate 7 are entangled with each other and are incompatible with each other.

On the other hand, in the FAB method, a thin Si layer or a metal oxide layer is formed on each of the two surfaces to be bonded, and each of the two surfaces is activated by irradiating each of the two surfaces with a neutron atom beam at room temperature, and then the two surfaces are activated. This is a method of directly bonding by pasting the surfaces together. When the FAB method is used, an adhesive layer such as a thin Si layer or a metal oxide layer is formed between the layer to be the buffer layer 9*b* and the reinforcing substrate 7.

Figure 6:
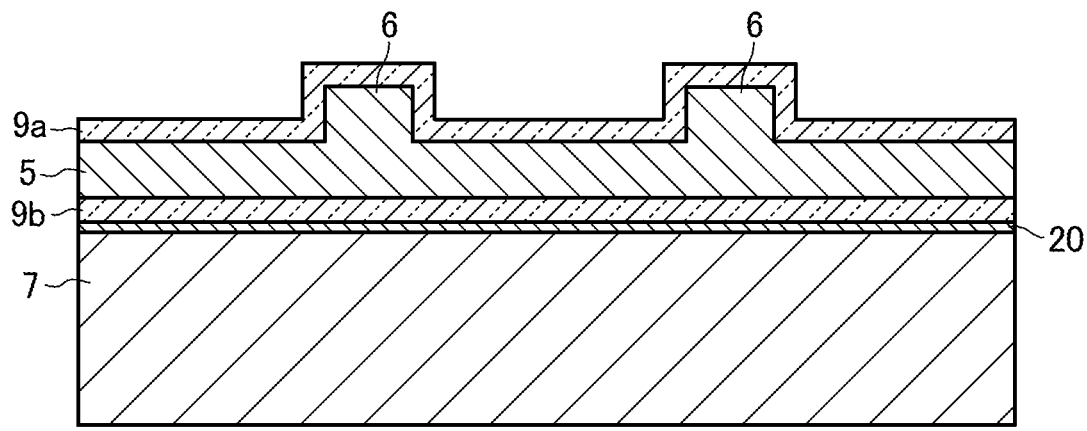
FIG. 6 is a view showing a fourth example of the cross-sectional structure of the optical waveguide element according to the embodiment of the present invention, and is a cross-sectional view taken along the line segment PP of FIG. 1.

When the buffer layer 9*b* and the reinforcing substrate 7 are directly bonded using the FAB method, as shown in FIG. 6, an extremely thin adhesive layer 20 having a thickness of about 10 to 500 nm is formed between the buffer layer 9*b* and the reinforcing substrate 7. For the adhesive layer 20, Si, $Al_2O_3$, $Ta_2O_5$, $TiO_2$, $Nb_2O_5$, $Si_3N_4$, AlN, $SiO_2$ and the like are used.

FIG. 6 is a diagram showing a fourth example of the cross-sectional structure of the optical waveguide element according to the embodiment of the present invention, and is a cross-sectional view taken along the line P-P of FIG. 1. Note that FIG. 6 illustrates a cross-sectional structure seen from the same viewpoint as in FIG. 2. In FIG. 6, the optical waveguide element 1 is shown in such a manner that the thickness direction of the optical waveguide element 1 is the vertical direction of the paper surface, the width direction of the optical waveguide element 1 is the horizontal direction of the paper surface, and the longitudinal direction of the optical waveguide element 1 is the direction perpendicular to the paper surface.

Some of the materials that can be used as the adhesive layer 20 have high light absorption. However, the lower surface buffer layer 9*b* exists between the adhesive layer 20 and the substrate 5, so that the lower surface buffer layer 9*b* can suppress the light absorption by the adhesive layer 20. In other words, when the buffer layer 9*b* and the reinforcing substrate 7 are directly bonded using the FAB method, the lower surface buffer layer 9*b* plays a role of alleviating stress bias on the upper surface and the lower surface of the substrate 5, and, at the same time, suppressing absorption of propagating light by the adhesive layer 20.

In the present embodiment, a rib-type substrate in which a rib portion 6 is formed on the substrate 5 is described as an example. However, as described above, the present invention is not limited to the rib-type substrate, but can be applied to, for example, a substrate in which the optical waveguide 10 is formed in the substrate 5 by thermal diffusion of a metal. Similarly, in the substrate having the diffusion type optical waveguide, the stress bias on the upper surface and the lower surface of the substrate 5 can be alleviated by having the structure in which the upper surface buffer layer 9*a* and the lower surface buffer layer 9*b* sandwich the substrate 5.

Further, in the present embodiment, a coplanar line structure in which one ground electrode G is arranged on each side of one signal electrode S is described as an example. However, the present invention is not limited to such a coplanar line structure, and for example, a coplanar line structure having a differential line in which one ground electrode G is arranged on each side of two parallel signal electrodes S may be adopted.

Figure 7:
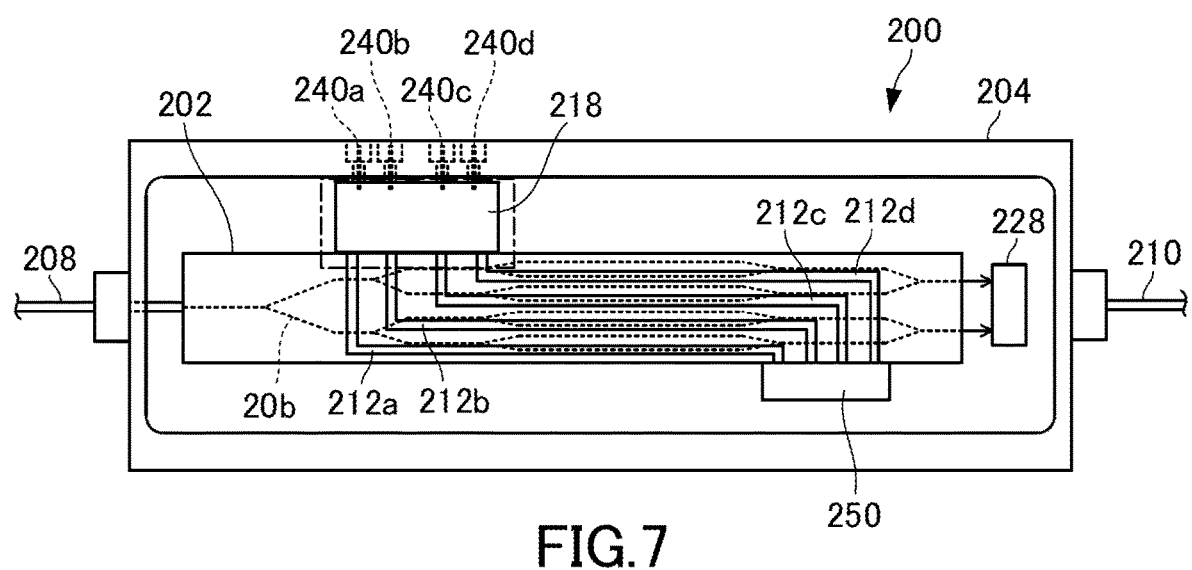
FIG. 7 is a plan view showing an example of the configuration of the optical modulator according to the embodiment of the present invention.

The present invention can provide an optical modulator at least partly constituted by the optical waveguide constituting the optical waveguide element described FIG. 7 is a plan view showing an example of the configuration of the optical modulator 200 according to the embodiment of the present invention. The optical modulator 200 shown in FIG. 7 is provided with: an optical waveguide element 202; a housing 204 that accommodates the optical waveguide element 202; an input optical fiber 208 that injects light on the optical waveguide element 202; and an output optical fiber 210 that guides the output light to the outside of the housing 204. The configuration of the optical modulator 200 shown in FIG. 7 is only an example, and the present invention is not limited to this configuration. It is possible to incorporate an optical waveguide element having the properties according to the present invention into an optical modulator having an arbitrary configuration.

The optical modulator 200 shown in FIG. 7 has an input optical fiber 208 at one end in the longitudinal direction (left side in the drawing) and an output optical fiber 210 at the other end in the longitudinal direction (right side in the drawing). The input position and output position of the light in the above optical module 200 can be set arbitrarily.

The optical waveguide element 202 has, for example, an optical waveguide 206 provided on the substrate and a plurality of electrodes 212a to 212d formed on the substrate to modulate the light wave propagating in the optical waveguide 206. The optical waveguide element 202 has, for example, as shown in FIG. 7, an optical waveguide 206 in which a plurality of Mach-Zehnder type optical waveguides are combined.

As an example, the optical modulator 200 shown in FIG. 7 is so configured that two lights are outputted from the optical waveguide element 202, and polarized and synthesized by the polarization synthesis unit 228, and the then outputted to the outside of the housing 204 through the output optical fiber 210. However, the optical modulator 200 according to the present invention is not limited to such a configuration. For example, as in the optical waveguide element 1 shown in FIG. 1 described above, a configuration may be provided in which the first synthesis unit 3a is provided and one optical signal is outputted from the exit waveguide.

Further, the optical waveguide element 202, as well as the optical waveguide element 1 described above, has such a configuration that the upper surface buffer layer and the lower surface buffer layer, which are made of substantially the same material and have substantially the same thickness, are in contact with the upper surface and the lower surface of the substrate, respectively. By this configuration, the upper surface buffer layer and the lower surface buffer layer sandwich the substrate, so that the uniformization of the stress balance on the upper surface and the lower surface of the substrate is realized.

The housing 204 is composed of a case and a cover to which the optical waveguide element 202 is fixed. The cover is arranged to cover the entire case, whereby the inside of the housing 204 is hermetically sealed. An electronic component such as a driver or a light receiving element (PD: Photo Detector) may be housed in the housing 204.

The case of the housing 204 is provided with a plurality of lead pins 240a to 240d which are conductors for inputting high frequency signals. The lead pins 240a to 240d are connected to one end of each of a plurality of electrodes 212a to 212d provided in the Mach-Zehnder type optical waveguide of the optical waveguide element 202 through a relay substrate 218. Further, the other ends of the plurality of electrodes 212a to 212d are terminated by a termination substrate 250 which is an impedance element. Although the detailed configuration is not shown in FIG. 7, the plurality of electrodes 212a to 212d include the signal electrode S and the ground electrode G so that the light wave propagating in the optical waveguide 206 can be modulated.

As described above, according to the present invention, it is possible to provide the optical modulator including the optical waveguide element having such a configuration that the upper surface buffer layer and the lower surface buffer layer, which are composed of substantially the same material and have substantially the same thickness, are formed to be in contact with the upper surface and the lower surface of the substrate, respectively.

The present invention is not limited to the above-described embodiments and modifications, but includes various modifications and design changes within the technical scope thereof without departing from the technical idea of the present invention.

INDUSTRIAL APPLICABILITY

The present invention provides an optical waveguide element and an optical modulator that can prevent the damage to the substrate and the deterioration of the properties of the substrate that may occur due to the stress, by reducing the influence of stress on the substrate by the buffer layer, and therefore, is applicable to the optical communication field, the optical measurement field, and the like.

EXPLANATION OF REFERENCE NUMERALS 1,202 Optical Waveguide Element
2a-2c Branch Portion
3a-3c Synthesis Portion
5,102 Substrate
6 Rib Portion
7,101 Reinforcing Substrate
9a Upper Buffer Layer (First Buffer Layer)
9b Lower Buffer Layer (Second Buffer Layer)
10,206 Optical Waveguide
20 Adhesive Layer
103 Buffer Layer
200 Optical Modulator
204 Housing
208 Input Optical Fiber
210 Output Optical Fiber
212a, 212b, 212c, 212d Electrodes
218 Relay Substrate
228 Polarization Synthesis Portion
240a, 240b, 240c, 240d Lead Pin
250 Termination Board
G Ground Electrode
S Signal Electrode

What is claimed is:
1. An optical waveguide element, comprising:
a substrate having an electro-optical effect;
an optical waveguide formed on the substrate, wherein a rib portion projecting from the substrate is used as the optical waveguide;
a first buffer layer provided on the substrate;
a second buffer layer provided under the substrate, and
a reinforcing substrate arranged under the second buffer layer, wherein
the first buffer layer and the second buffer layer are composed of substantially the same material and have substantially the same thickness, and the first buffer layer and the second buffer layer are formed to be in contact with an upper surface and lower surface of the substrate, respectively, and
a lower surface of the second buffer layer and an upper surface of the reinforcing substrate are directly bonded by the direct bonding method to form an interface layer or an adhesive layer between the lower surface of the second buffer layer and the upper surface of the reinforcing substrate, the interface layer being a layer in which molecular chains of the lower surface of the buffer layer and the upper surface of the reinforcing substrate are entangled with each other and are incompatible with each other, and the adhesive layer having a thickness of 10 to 500 nm.

2. The optical waveguide element according to claim 1, wherein
the first buffer layer and the second buffer layer are respectively formed by: a mixture of silicon oxide and at least one oxide of one or more elements selected from the metal elements of groups 3-8, 1b and 2b of the periodic table and semiconductor elements other than silicon; or a transparent insulating film of an oxide of silicon and one or more elements selected from the metal element and the semiconductor element.

3. The optical waveguide element according to claim 1, wherein
material of the first buffer layer and the second buffer layer has a lower refractive index than the material of the substrate having an electro-optical effect.

4. The optical waveguide element according to claim 1, wherein
the material of the first buffer layer and the second buffer layer has an electrical resistivity of 108 Ωcm or more and 1016 Ωcm or less.

5. The optical waveguide element according to claim 1, wherein
the material of the first buffer layer and the second buffer layer respectively have a thickness of 0.3 μm or more and 2.0 μm or less.

6. The optical waveguide element according to claim 1, wherein
the optical waveguide is formed by a plurality of Mach-Zehnder portions.

7. An optical modulator at least partly constituted by the optical waveguide constituting the optical waveguide element according to claim 1.

8. The optical wave guide element according to claim 1, wherein the interface layer is formed by a plasma activated bonding method as the direct bonding method.

9. The optical wave guide element according to claim 1, wherein the adhesive layer is formed by a Fast Atom Beam method as the direct bonding method.

10. The optical wave guide element according to claim 1, wherein the second buffer layer and the reinforcing substrate are bonded without any electrodes being positioned between the second buffer layer and the reinforcing substrate.

* * * * *